United States Patent Office 2,705,229
Patented Mar. 29, 1955

2,705,229

PREPARATION OF OCTAFLUOROHEXATRIENE

Robert P. Ruh, Ralph A. Davis, and Keith A. Allswede, Midland, Mich., assignors to The Dow Chemical Company, Midland, Mich., a corporation of Delaware No Drawing. Application November 18, 1953, Serial No. 393,008

6 Claims. (Cl. 260—92.1)

This invention relates to a process for the preparation of a new compound, octafluorohexatriene, and to several other new fluorine-containing perhalogenated acyclic hydrocarbons.

It is a principal object of this invention to provide a new compound, octafluoro-1,3,5-hexatriene, and a process for its preparation. A related object is to provide polymers of octafluoro-1,3,5-hexatriene. Another object is to provide new fluorine-containing halogenated aliphatic hydrocarbons having six carbon atoms in the chain. Further objects and advantages are apparent from the following description.

The new compound octafluoro-1,3,5-hexatriene which has been prepared in accord with the process of the invention is a colorless, low-boiling, nonflammable liquid, being readily soluble in most of the common non-polar organic solvents but relatively insoluble in water. This unique perfluorohexatriene can be employed as a chemical intermediate in the synthesis of other more highly saturated chemical compounds, e. g. 1,2,3,4,5,6-hexabromo-1,1,2,3,4,5,6,6-octafluorohexane by bromination. Unlike other perfluoro olefins, octafluorohexatriene polymerizes so readily at room temperature that it can be maintained as a monomer only with difficulty by low temperature refrigeration or other suitable means, e. g. by employing an anti-oxidant-type inhibitor. Octafluoro-1,3,5-hexatriene can be polymerized either to low molecular weight viscous oily liquids and grease-like semisolids or to high molecular weight rubbery solids. These polymers possess good electrical insulating properties and are stable to heat, light, and chemical attack. In addition to thermal stability, the low polymers in the oil and grease range have good lubricating properties and may be employed per se as high temperature lubricants. They may also be fluorinated to the corresponding saturated fluorocarbon products. The high molecular weight solid polymers exhibit a number of the characteristics of rubber and have useful mechanical properties. They may be produced by heating perfluorohexatriene under high pressures in the presence of peroxide catalysts. These solid rubbery polymers become softer and more elastic upon heating and may be pressed, molded, or extruded into many different and useful objects such as films, sheets, gaskets, tubes, diaphragms, bushings, and the like. Monomeric octafluoro-1,3,5-hexatriene may, if desired, be copolymerized with other olefinic compounds such as ethylene, acrylonitrile, and styrene to give polymers having unique properties.

According to the process of the present invention, octafluoro-1,3,5-hexatriene may be produced at moderate temperatures and pressures by a new process involving the steps of:

(1) Thermally trimerizing 1,2-dichloro-1,2-difluoroethylene to 1,3,4,5,6,6-hexachloro-1,2,3,4,5,6-hexafluorohexene-1.

(2) Chlorinating 1,3,4,5,6,6-hexachloro - 1,2,3,4,5,6-hexafluorohexene-1 to 1,1,2,3,4,5,6,6-o c t a c h l o r o-1,2,3,4,5,6-hexafluorohexane.

(3) Fluorinating 1,1,2,3,4,5,6,6-octachloro-1,2,3,4,5,6-hexafluorohexane to 1,2,3,4,5,6-hexachloro-1,1,2,3,4,5,-6,6-octafluorohexane.

(4) And dechlorinating the 1,2,3,4,5,6-hexachloro-1,1,2,3,4,5,6,6-octafluorohexane to octafluoro-1,3,5-hexatriene.

These steps are illustrated by the following simplified chemical diagram:

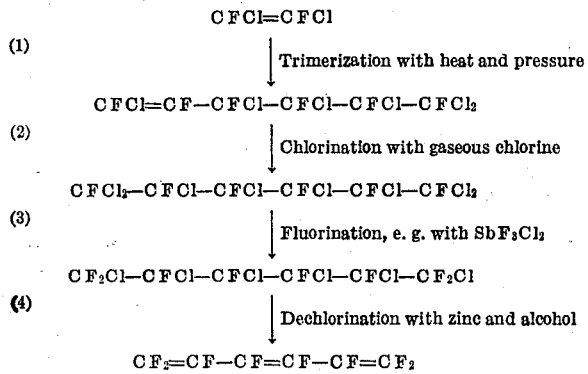

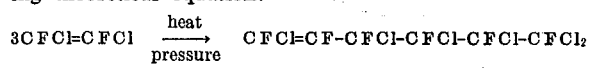

The trimerization step (1) may be carried out by heating CFCl=CFCl in a closed vessel under its autogenous pressure at a temperature in the range of about 200° C. to about 400° C. and preferably in the range of 250° to 350° C. for a time sufficiently long to bring about the desired degree of reaction as expressed by the folllowing theoretical equation:

$$3\,CFCl{=}CFCl \xrightarrow[\text{pressure}]{\text{heat}} CFCl{=}CF\text{-}CFCl\text{-}CFCl\text{-}CFCl\text{-}CFCl_2$$

Almost any steel reaction vessel strong enough to contain the symmetrical dichlorodifluoroethylene at the temperature of the reaction is satisfactory as a reactor. Agitation is generally applied to the contents of the reaction vessel to maintain a uniform temperature throughout. Maximum conversion to the trimmer CFCl=CF—CFCl—CFCl—CFCl—CFCl₂ may usually be obtained at a temperature between about 275° C. and 300° C. The optimum temperature of the reaction varies inversely with the length of the heating period, e. g. for comparably high conversions, a longer reaction time is required at 275° C. than at 300° C. Heating periods of from five to twenty hours or more may be employed, although short reaction times produce considerably higher amounts of the dimer, CFCl=CF—CFCl—CFCl₂ and lower the overall yield of the desired product, CFCl=CF—CFCl—CFCl—CFCl—CFCl₂. For both maximum conversions and yields, therefore, the symmetrical dichlorodifluoroethylene is usually heated at a temperature of from about 275° C. to 300° C. while the pressure rises to a maximum value, e. g. in the range of from about 1500 pounds to 2000 pounds per square inch gauge at 275° C., and then falls off to a lower level of about 400 p. s. i. g. This usually requires about 6 hours and no longer than about 10 hours. If heating is continued for several hours longer, the percentage of trimer in the reaction product can be increased by a factor of 2 or more. In addition to 1,3,4,5,6,6-hexachloro-1,2,3,4,5,6-hexafluorohexene-1 which comprises the bulk of the trimer, a small proportion of hexachloro-1,2,3,4,5,6-hexafluorohexene-2 or -3 or both are probably also present.

Following trimerization, the trimer is subjected to the chlorination step (2) of the process. This step is accomplished in the presence of actinic light, such as ultraviolet light or direct sunlight, by bubbling gaseous chlorine into liquid trimer until approximately equimolecular proportions have reacted, i. e. until chlorine is no longer absorbed. The reaction proceeds substantially to completion according to the following equation:

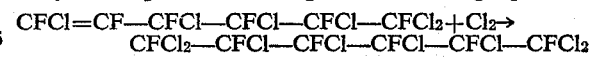

The other two lesser isomers of the trimer yield the same chlorination product. A glass flask or ceramic-lined vessel preferably equipped with a water-cooled reflux condenser may be employed as a reactor. The temperature at which this exothermic chlorination reaction may be carried out is not critical and temperatures between 20° C. and 100° C. are both convenient and practical. Although somewhat lower temperatures or even a temperature as high as the reflux temperature of the reaction mixture may be employed, no advantage appears to be derived by operating at such conditions.

The chlorinated product may be purified or employed per se in the fluorination step (3). This fluorination is generally conducted in the liquid phase in a closed reaction vessel under conditions of good mixing and under the autogenous pressure of the reaction mixture while employing a fluorinating agent such as antimony fluorohalide or antimony fluoride and chlorine. The fluorination may also be accomplished in the vapor phase, as by the means of HF and a catalyst such as chromium fluoride. However, liquid phase fluorination with a fluoride of antimony is usually preferred for best conversions and yields of the desired product. The antimony fluoride should preferably contain at least five per cent by weight of pentavalent antimony and is desirably $SbF_3Cl_2$. In general, theoretical or slightly greater than theoretical proportions of fluorine and temperatures in the range of 150° to 350° C. are satisfactory when a fluoride of antimony is employed as the fluorinating agent. When approximately equimolecular proportions of $$CFCl_2—CFCl—CFCl—CFCl—CFCl—CFCl_2$$

and $SbF_2Cl_2$ are reacted to completion under optimum conditions, greater than 90 weight per cent of the chlorofluorohexane reactant may be fluorinated to $$CF_2Cl—CFCl—CFCl—CFCl—CFCl—CF_2Cl$$

according to the reaction:

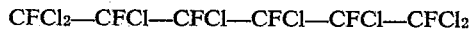

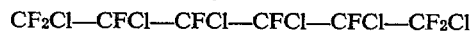

Following fluorination, the product $$CF_2Cl—CFCl—CFCl—CFCl—CFCl—CF_2Cl$$

is ordinarily purified and then subjected to the dechlorination step (4). This step may be accomplished with zinc in the presence of a lower alkanol under essentially anhydrous conditions. The alkanols which may advantageously be employed in the instant process are those having less than six carbon atoms per molecule, such as methanol, ethanol, isopropanol, sec-butanol, etc. Usually $CF_2Cl—CFCl—CFCl—CFCl—CFCl—CF_2Cl$ is dissolved in an approximately equal volume of absolute ethanol and gradually added to a slurry of powdered zinc and absolute ethanol. A sufficiently large amount of zinc to react with essentially all of the chlorine atoms of the chlorofluorohexane is generally employed, e. g. slightly greater than three atomic proportions of zinc per molecular proportion of $$CF_2Cl—CFCl—CFCl—CFCl—CFCl—CF_2Cl$$

The dechlorination reaction is highly exothermic and may be represented by the following equation:

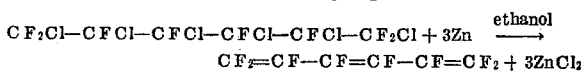

This step may be carried out in a glass flask or ceramic-lined vessel equipped with a water-cooled reflux condenser. The dechlorination proceeds quite rapidly at a temperature in the range of 20° to 100° C. and is conveniently conducted at the reflux temperature of the reaction mixture, i. e. approximately 80° C. when ethanol is the alcoholic solvent. The rate at which octafluoro-1,3,5-hexatriene is formed is roughly proportional to the rate of addition of the chlorofluorohexane reactant, i. e. dechlorination occurs almost instantaneously upon combining the reactants. Following the addition of all the chlorofluorohexane, the reaction mixture is ordinarily heated for a short period of time to insure essentially complete reaction. Octafluoro-1,3,5-hexatriene which boils at about 65° C. may then be separated from the reaction mixture by fractional distillation.

The various step-wise reactions of the instant process may be carried out in a consecutive manner without separating the desired reaction product of each step from the total organic product mixture of that step. For example, the total product from the trimerization step may be subjected to chlorination, the entire product from the chlorination step may be fluorinated, and the total organic product from the fluorination step may be dechlorinated without separating the organic reaction products of any step from start until finish. It is usually desirable, however, at least to separate the trimer, chiefly $$CFCl=CF—CFCl—CFCl—CFCl—CFCl_2$$

from the product mixture of the trimerization step (1) before proceeding with the chlorination step (2). For best results, the desired product from each step of the process is preferably separated from the unconverted reactant and any other reaction products before being further reacted. In this manner, higher overall conversions and yields of the desired end-product, octafluoro-1,3,5-hexatriene, may be obtained.

The example which follows illustrates the process of the invention, but is not to be construed as limitative. As used therein, the term conversion has the following meaning:

$$\text{Conversion} = \frac{\text{moles of product recovered}}{\text{moles of reactant charged}} \times 100$$

EXAMPLE

Octofluoro-1,3,5-hexatriene was produced from symmetrical dichlorodifluoroethylene according to the method hereinafter described:

*Trimerization of 1,2-dichloro-1,2-difluoroethylene*

A cylindrical 4-liter steel reaction vessel evacuated to 1 mm. mercury absolute pressure was cooled to below 10° C. and charged with 1729 grams (13 moles) of liquid 1,2-dichloro-1,2-difluoroethylene. The $CFCl=CFCl$ so charged was a mixture of cis and trans isomers boiling at approximately 22° C. Thereupon the steel reactor containing the symmetrical dichlorodifluoroethylene was heated rapidly to 275° C. and maintained at this temperature under conditions of good agitation throughout the heating period. At the start of the reaction, the pressure rose rapidly to a maximum of 1500 p. s. i. g. and then dropped slowly to 185 p. s. i. g. after about 6 hours. Heating was continued for approximately 11 hours longer and at the end of this time, the pressure had fallen off to about 120 p. s. i. g. The reaction vessel and its contents were then cooled below 10° C. and the liquid reaction product weighing 1697 grams was removed and subjected to fractional distillation. In addition to 60 grams of recovered starting material $CFCl=CFCl$, there were obtained 1180 grams of dimeric $$CFCl=CF—CFCl—CFCl_2$$

90 grams of an intermediate fraction boiling between the symmetrical dichlorodifluoroethylene and the dimer, 347 grams (0.87 mole) of trimeric material, chiefly $$CFCl=CF—CFCl—CFCl—CFCl—CFCl_2$$

and a few grams of higher boiling material, probably tetramers and pentamers. Based on the moles of $$CFCl=CFCl$$

charged, this represents a conversion to trimer of 20.1 mole per cent and a total recovery of 97.1 weight per cent. The trimer fraction boiling from about 115° to 118° C. at 31 mm. mercury absolute was redistilled and the material so purified was identified as chiefly $$CFCl=CF—CFCl—CFCl—CFCl—CFCl_2$$

by mass spectrometry and other analyses, e. g. dechlorination with zinc and ethanol gave $$CFCl=CF—CF=CF—CF=CFCl$$

a new compound boiling at about 132° to 134° C. Since the trimer, $CFCl=CF—CFCl—CFCl—CFCl—CFCl_2$, is also a new compound having utility as a chemical intermediate in the instant process as well as in the above-mentioned dechlorination, some of its properties are listed as follows: boiling point=224.4° C. at 760 mm. mercury absolute; freezing point=−28.8° C.; density=1.764 at 25° C.; and refractive index $(n/D)=1.4441$ at 25° C. By chlorine analysis, this new compound was found to contain 52.9% chlorine (theory=53.2%).

*Chlorination of 1,3,4,5,6,6-hexachloro-1,2,3,4,5,6-hexafluorohexene-1*

Into a one liter glass flask equipped with a reflux condenser was charged 1192 grams (3.0 moles) of $$CFCl=CF—CFCl—CFCl—CFCl—CFCl_2$$

prepared from a number of runs as described above. Gaseous chlorine was rapidly bubbled into the liquid hexachlorohexafluorohexene irradiated by a 250 watt sun lamp. At the end of about 4 hours, the reaction was substantially complete and the addition of chlorine to the reaction mixture was discontinued. Upon fractional distillation of the reaction product there was obtained 489 grams (1.23 moles) of unreacted $$CFCl=CF-CFCl-CFCl-CFCl-CFCl_2$$

and 798 grams (1.70 moles) of $$CFCl_2-CFCl-CFCl-CFCl-CFCl-CFCl_2$$

Based on the moles of $$CFCl=CF-CFCl-CFCl-CFCl-CFCl_2$$

charged, this represents a conversion to $$CFCl_2-CFCl-CFCl-CFCl-CFCl-CFCl_2$$

of 56.7 mole per cent and a total recovery of 97.7 mole per cent.

The new compound $$CFCl_2-CFCl-CFCl-CFCl-CFCl-CFCl_2$$

so obtained was identified by mass spectrometry and other analyses. It was a colorless liquid having a boiling point of 132.0° to 134.5° C. at 5 mm. mercury absolute, a density of 1.918 at 25° C., and a refractive index (n/D) of 1.4738 at 25° C. From the refractive index and density was calculated a molecular refraction of 68.84. This compares favorably with the value 68.61 which is the sum of the atomic refractions.

*Fluorination of 1,1,2,3,4,5,6,6-octachloro-1,2,3,4,5,6-hexafluorohexane*

A charge of 511 grams (1.28 mole) of $$CFCl_2-CFCl-CFCl-CFCl-CFCl-CFCl_2$$

prepared according to the above procedure and 240 grams (0.96 mole) SbF$_3$Cl$_2$ was heated to 250° C. in a 1500 cc. high pressure reaction vessel and maintained at this temperature under conditions of good agitation for two hours. At the end of the heating period, the organic reaction product was cooled, washed with water to remove antimony salts, and dried with anhydrous calcium sulfate. Thereupon, the dry product weighing 453 grams was fractionally distilled and 233 grams (0.53 mole) of $$CF_2Cl-CFCl-CFCl-CFCl-CFCl-CF_2Cl$$

was obtained. Based on the $$CFCl_2-CFCl-CFCl-CFCl-CFCl-CFCl_2$$

charged, this represents a conversion to $$CF_2Cl-CFCl-CFCl-CFCl-CFCl-CFCl_2$$

of 41.4 mole per cent.

The structural formula $$CF_2Cl-CFCl-CFCl-CFCl-CFCl-CF_2Cl$$

of this new chlorofluorohexane was corroborated by mass spectrometry and other methods, e. g. the halogen content as determined by chemical analyses is as follows: 48.9% chlorine (theory=48.8% Cl) and 33.7% fluorine (theory=34.8% F.). This compound is a colorless liquid and was found to have a boiling point of 119.5° to 120.5° C. at 26 millimeters of mercury absolute (88° C. at 5 mm. Hg abs.), a density of 1.8803 at 25° C./4° C., and a refractive index (n/D) of 1.4240 at 25° C.

Both of the above-described new compounds corresponding to the general formula:

$$CFClX-CFCl-CFCl-CFCl-CFCl-CFClX$$

wherein X is chlorine or fluorine, i. e.

$$CFCl_2-CFCl-CFCl-CFCl-CFCl-CFCl_2$$

and $$CF_2Cl-CFCl-CFCl-CFCl-CFCl-CF_2Cl$$

are colorless, high-boiling, non-flammable liquids which are stable against heat and oxidation. They have slight rubber-swelling characteristics and are useful as additives to liquid organosiloxane polymers, particularly those having utility as hydraulic fluids. In such use these compounds impart lubricity and non-flammability to the polymers and counteract the tendency of the organosiloxanes to shrink rubber. These new chlorofluorohexanes also find use as heat exchange liquids.

*Dechlorination of 1,2,3,4,5,6-hexachloro-1,1,2,3,4,5,6,6-octafluorohexane*

A one liter glass flask equipped with a dropping funnel, reflux condenser, and mechanical stirring device was charged with 130 grams (2.0 moles) of powdered zinc. To this charge of zinc was gradually added 225 grams (0.5 mole) of $$CF_2Cl-CFCl-CFCl-CFCl-CFCl-CF_2Cl$$

prepared as described above in 300 milliliters of absolute ethanol. This addition required 2 hours, the rate of addition being such as to maintain a steady reflux of the absolute ethanol. When all of the alcoholic solution of CF$_2$Cl—CFCl—CFCl—CFCl—CFCl—CF$_2$Cl had been added to the flask, the reaction mixture was heated under reflux for a short period of time, and then cooled, washed with water, and dried. The dry, water-washed product was subjected to fractional distillation and 65 grams of crude CF$_2$=CF—CF=CF—CF=CF$_2$ boiling at 60° to 69° C. at 748 mm. mercury absolute was obtained.

This crude product was then purified by refractionation to give a colorless liquid having a boiling point of 65° to 66° C. at 748 mm. mercury absolute, a density of 1.537 at 25° C. and a refractive index (n/D) of 1.537 at 25° C. By mass spectrometric analysis, this liquid was identified as CF$_2$=CF—CF=CF—CF=CF$_2$. No chlorine could be detected by chemical analyses.

When octafluoro-1,3,5-hexatriene prepared according to the above-described procedure was subjected to mild heating in the presence of air, it polymerized rapidly to a solid, rubbery polymer.

That which is claimed is:

1. A process for the preparation of octafluoro-1,3,5-hexatriene which comprises dechlorinating 1,2,3,4,5,6-hexachloro-1,1,2,3,4,5,6,6-octafluorohexane with zinc in the presence of alcohol.

2. A process for the preparation of octafluoro-1,3,5-hexatriene which comprises fluorinating 1,1,2,3,4,5,6,6-octachloro - 1,2,3,4,5,6 - hexafluorohexane to 1,2,3,4,5,6-hexachloro-1,1,2,3,4,5,6,6-octafluorohexane and dechlorinating this latter compound to octafluoro-1,3,5-hexatriene with zinc in the presence of alcohol under essentially anhydrous conditions.

3. A process for the preparation of octafluoro-1,3,5-hexatriene which comprises chlorinating 1,3,4,5,6,6-hexachloro-1,2,3,4,5,6-hexafluorohexene-1 to 1,1,2,3,4,5,6,6-octachloro-1,2,3,4,5,6-hexafluorohexane, fluorinating 1,1,-2,3,4,5,6,6 - octachloro - 1,2,3,4,5,6 - hexafluorohexane to 1,2,3,4,5,6-hexachloro-1,1,2,3,4,5,6,6 - octafluorohexane, and dechlorinating this latter compound to octafluoro-1,3,5-hexatriene with zinc in the presence of a lower alkanol under essentially anhydrous conditions.

4. A process for the preparation of octafluoro-1,3,5-hexatriene which comprises heating 1,2-dichloro-1,2-difluoroethylene in a closed vessel at a temperature in the range of 200° to 400° C. for a time sufficiently long to form 1,3,4,5,6,6-hexachloro-1,2,3,4,5,6-hexafluorohexene-1, chlorinating the 1,3,4,5,6,6-hexachloro-1,2,3,4,5,6-hexafluorohexene-1 to 1,1,2,3,4,5,6,6-octachloro-1,2,3,4,5,6-hexafluorohexane, fluorinating the 1,1,2,3,4,5,6,6-octachloro-1,2,3,4,5,6-hexafluorohexane to 1,2,3,4,5,6-hexachloro-1,1,2,3,4,5,6,6-octafluorohexane, and dechlorinating this latter compound to octafluoro-1,3,5-hexatriene with zinc in the presence of a lower alkanol under essentially anhydrous conditions.

5. Octafluoro-1,3,5-hexatriene.

6. Polymeric octafluoro-1,3,5-hexatriene.

References Cited in the file of this patent

UNITED STATES PATENTS 2,664,449 Miller _____ Dec. 29, 1953
2,668,182 Miller _____ Feb. 2, 1954